Nov. 13, 1962 L. J. MAYER ETAL 3,063,866

METHOD OF FORMING BISMUTH WHISKERS

Filed Dec. 2, 1960

INVENTORS
LUDWIG J. MAYER
ROBERT J. RICKETT
HEINRICH F. STENEMANN
BY Harold D. Jastram
ATTORNEY 3,063,866
METHOD OF FORMING BISMUTH WHISKERS

Ludwig J. Mayer, St. Paul, Robert J. Rickett, Minneapolis, and Heinrich F. Stenemann, St. Paul, Minn., assignors to General Mills, Inc., a corporation of Delaware Filed Dec. 2, 1960, Ser. No. 73,212
8 Claims. (Cl. 117—71)

This invention relates to a method of preparing bismuth whiskers. It should be explained at the outset that bismuth whiskers within the meaning of this invention are defined as filamentary single crystal wires of bismuth having a diameter between one tenth of a micron and several microns and possessing a length from about one millimeter to several centimeters.

While bismuth whiskers will have various uses, it may be helpful in appreciating the benefits of this invention to point out that such whiskers can be employed in the measuring, read-out and mapping of magnetic fields in situations where a very high resolving power in one direction is required. Bismuth is the element possessing the highest known magneto-resistive and Hall effect. Actually, only a few semi-conducting alloys, such as indium antimonide, have higher values. In the envisaged measuring applications, extremely small bismuth probes are best suited for such undertakings, and inasmuch as extremely thin bismuth whiskers are readily obtainable when practicing this invention, the invention does have appreciable value in the alluded to field. Likewise, in cases where the field strength or magnetization is constant in one direction, as for instance in magnetic tape recording, the desired high read-out resolving power in the lengthwise direction can best be realized with the extremely thin bismuth whiskers falling within the purvue of the instant invention.

Without attempting to present a complete list of uses for bismuth whiskers, it might be mentioned that as an additional use that such whiskers will be of value as strain gauges because they exhibit not only a magneto-resistive but also piezo-resistive effects. Consequently, in applications where strains must be measured in extremely small areas, micro-strain gauges constructed from bismuth whiskers will carry with them decided advantages.

Although various attempts have been made in the past to produce bismuth whiskers, these attempts have had attendant shortcomings. Largely, the prior art has produced rather short whiskers and also the earlier efforts have resulted in a rather slow rate of whisker growth. Accordingly, the present invention has for one object the production of relatively long whiskers, being of the order of a few millimeters to a few centimeters as above pointed out. The invention also has as an important goal the production of bismuth whiskers in a relatively short period of time. By means of the technique to be described below, bismuth whisker growths can be accomplished in a matter of hours instead of months and to lengths mentioned above instead of just a few microns.

Figure 1:
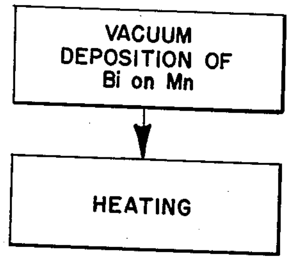
Figure 2:
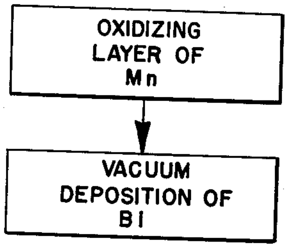
Figure 3:
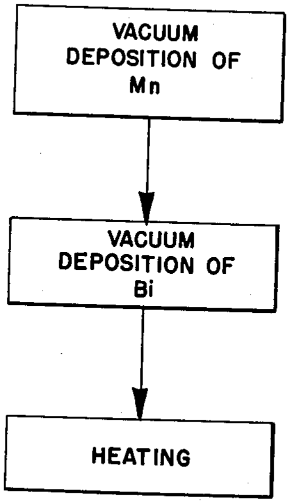
Figure 4:
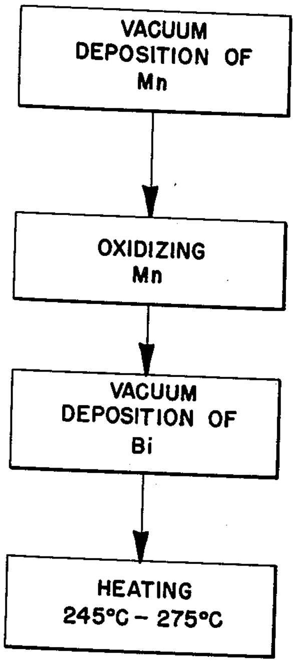

Other objects and advantages to this invention will become apparent upon reading the subsequent specification in view of the drawings in which, FIGURE 1 is a flow diagram of a process using heat treatment, FIGURE 2 is a flow diagram of a process where a layer of manganese is oxidized, FIGURE 3 is a flow diagram of a process where vacuum deposition is used to form two (2) superimposed layers of material and;

FIGURE 4 is a flow diagram of a process utilizing oxidation and heat treatment of superimposed layers of material.

Describing the invention in detail, it should first be explained that a base member is selected, a glass disk that has been well cleaned by conventional methods being the type of base that has been found quite satisfactory in actual practice. Onto this base a thin film of manganese is deposited by vacuum evaporation. Vacuum evaporation techniques are old and well known, but if additional information is desired the book Vacuum Deposition of Thin Films, by L. Holland, which is published by John Wiley and Sons, Inc., New York (1956), may be referred to. However, there are many sources of information that could be examined. Having formed the layer of manganese as outlined above, a thin layer of bismuth is then vacuum evaporated thereover. Although the thicknesses of the manganese and bismuth layers are susceptible to some modification, it should be made manifest at this time that both layers should be approximately the same thickness and this thickness may desirably range from a few tenths of a micron to about one micron. Apparently, the manganese serves as a kind of "catalyst," there being no whisker growth without the manganese being present, although the manganese itself does not combine with the bismuth within the whisker. However, during the course of the growth there may be some alloying of the manganese with the bismuth to form a manganese bismuthide film from which the pure bismuth whiskers protrude or extend. Another factor in the growth of bismuth whiskers is the accelerated growth that is realized by heat treating the bismuth and manganese. It has been found that the optimum heat treating temperature lies between 245° C. and 275° C. Thus, a temperature approximating 260° C., is highly desirable in practicing this invention, for it minimizes the length of time needed to grow the proper size of whisker. Another factor that is to be taken into account is that slight oxidation of the manganese layer before the bismuth is deposited tends to result in bismuth whiskers finer than those obtained without the oxidation. Consequently, when exceptionally slender or thin whiskers are desired, the oxidation step should be employed.

Certain modifications and variations of the invention as hereinbefore set forth may be made without departing from the spirit and scope thereof, and therefore only such limitations should be imposed as are indicated in the appended claims.

What is claimed:

1. The method of growing bismuth whiskers comprising the steps of vacuum depositing the bismuth from which the whiskers are to be formed onto a manganese substrate, and heat treating the deposited bismuth at a temperature from between 245° C., to 275° C.

2. The method of growing bismuth whiskers comprising the steps of vacuum depositing the bismuth from which the whiskers are to be formed onto a manganese substrate, and heat treating the deposited bismuth at an elevated temperature.

3. The method of forming bismuth whiskers comprising the steps of vacuum depositing a layer of manganese onto a clean glass substrate, and thereafter vacuum depositing a thin layer of bismuth onto the manganese.

4. The method of forming bismuth whiskers comprising the steps of oxidizing a layer of manganese to preferred degree, and then vacuum depositing a thin layer of bismuth thereon.

5. The method of claim 4 including the subsequent step of heat treating the two layers at a temperature of approximately 260° C.

6. The method of forming bismuth whiskers comprising the steps of producing a layer of manganese having a thickness of the order of a tenth of a micron to one micron and vacuum depositing thereon a layer of bismuth also having a thickness of approximately the same order.

7. The method of forming bismuth whiskers comprising the steps of vacuum depositing a layer of manganese on a non-metallic substrate, vacuum depositing a layer of bismuth onto the manganese layer, and heat treating the deposited bismuth at an elevated temperature.

8. The method of forming bismuth whiskers comprising the steps of vacuum depositing a layer of manganese having a thickness of the order of a tenth of a micron to one micron on a non-metallic substrate, oxidizing said manganese layer, vacuum depositing a layer of bismuth on said oxidized manganese and having a thickness of said order, and finally heat treating said bismuth at a temperature of 245° C. to 275° C.

References Cited in the file of this patent

UNITED STATES PATENTS 2,873,214 Schable ---------------- Feb. 10, 1959

OTHER REFERENCES

Murbach et al.: "The Origin of Stress in Metal Layers Condensed From the Vapor in High Vacuum," Proc. Phys. Soc. (London), 66B 905–10 (1953).

Brenner: "The Growth of Whiskers by the Reduction of Metal Salts," Acta Metallurgica, January 1956, vol. 4, pp. 62–74.

Brenner et al.: "Mechanism of Whisker Growth, III, Nature of Growth Sites," Acta Metallurgica, May 1956, vol. 4, pp. 268–270.